(12) United States Patent
Bilgic et al.

(10) Patent No.: US 7,778,662 B2
(45) Date of Patent: Aug. 17, 2010

(54) DISTRIBUTION OF TASKS AS A FUNCTION OF THE OPERATING MODE IN MOBILE COMMUNICATION TERMINALS HAVING TWO OR MORE MICROPROCESSORS

(75) Inventors: Attila Bilgic, Kirchheim (DE); Thuyen Le, München (DE); Bernhard Rohfleisch, Wolfratshausen (DE)

(73) Assignee: Infineon Technologies AG, Munich (DE)

( * ) Notice: Subject to any disclaimer, the term of this patent is extended or adjusted under 35 U.S.C. 154(b) by 1115 days.

(21) Appl. No.: 10/933,056

(22) Filed: Sep. 2, 2004

(65) Prior Publication Data

US 2005/0071488 A1 Mar. 31, 2005

(30) Foreign Application Priority Data

Sep. 2, 2003 (DE) ................. 103 40 424

(51) Int. Cl.
*H04M 1/00* (2006.01)
(52) U.S. Cl. .................................. 455/552.1
(58) Field of Classification Search ................. 455/574, 455/522.1
See application file for complete search history.

(56) References Cited

U.S. PATENT DOCUMENTS

| | | | | |
|---|---|---|---|---|
| 5,487,181 | A | * | 1/1996 | Dailey et al. ............... 455/90.2 |
| 6,016,312 | A | * | 1/2000 | Storm et al. ................. 370/311 |
| 6,400,925 | B1 | * | 6/2002 | Tirabassi et al. ............ 455/12.1 |
| 6,412,029 | B1 | * | 6/2002 | Mecklai et al. ................ 710/22 |
| 6,697,617 | B2 | * | 2/2004 | Liebenow .................... 455/425 |
| 6,990,320 | B2 | * | 1/2006 | LeCren ..................... 455/67.11 |
| 7,162,279 | B2 | * | 1/2007 | Gupta ......................... 455/574 |
| 7,178,147 | B2 | * | 2/2007 | Benhase et al. ............. 718/104 |
| 2003/0013477 | A1 | | 1/2003 | McAlinden |
| 2003/0109287 | A1 | | 6/2003 | Villaret |
| 2004/0072588 | A1 | * | 4/2004 | Beach et al. ............. 455/550.1 |

FOREIGN PATENT DOCUMENTS

DE 100 52 392 A1 5/2002
WO WO 98/14023 A1 4/1998

OTHER PUBLICATIONS

"Developing Embedded Software in Multi-Core SoCs", Paul Kimelman, from the British Company Chip-Design-Firma ARM Ltd., pp. 1-15.

* cited by examiner

*Primary Examiner*—Ajit Patel
(74) *Attorney, Agent, or Firm*—Eschweiler & Associates, LLC

(57) ABSTRACT

The processing of tasks in a mobile communication terminal that contains two or more microprocessors is disclosed. The processing rate of tasks is increased by redistribution of the tasks between the microprocessors as a function of the operating mode. Particularly in situations in which no conversation and/or no other type of payload signal transmission is taking place, tasks may be redistributed from the application processor to the modem processor and/or to the DSP, so that applications such as compression and/or decompression of video data can be processed more quickly.

9 Claims, 2 Drawing Sheets

DISTRIBUTION OF TASKS AS A FUNCTION OF THE OPERATING MODE IN MOBILE COMMUNICATION TERMINALS HAVING TWO OR MORE MICROPROCESSORS

REFERENCE TO RELATED APPLICATIONS

This application claims the benefit of the priority date of German application DE 103 40 424.4, filed on Sep. 2, 2003, the contents of which are herein incorporated by reference in their entirety.

FIELD OF THE INVENTION

The present invention relates to a method for processing tasks in mobile communication terminals having two or more microprocessors.

BACKGROUND OF THE INVENTION

Many advanced application programs (applications) such as the compression of video data, which are intended to run on mobile communication terminals, require relatively high computation power. The required computation power is often greater than the available computation power of modern so-called embedded microprocessing units (MPU). However, many modern mobile communication terminals contain baseband chips, on which two or more processors are integrated for different tasks, and which are each assigned to respective processors. Many of these tasks are not active at the same time, so that the maximum possible performance of the system is often not exploited when running applications.

The effectively available computation power thus represents a relatively low lower limit for applications that are to be run on a mobile communication terminal. One possible way to solve the problem is to use dedicated hardware accelerators, which are able to process specific applications with higher performance. However, this solution is not sufficiently flexible, since it requires a specific hardware design for each application that is to be sped up. Another possibility for speeding up the running of applications in mobile communication terminals is to use a dedicated external high-power MPU. However, this solution is generally highly costly, since it likewise requires additional external use of hardware.

Complex embedded system applications nowadays use chips that comprise a number of microprocessors, on-chip memory elements and coprocessors. The combination of processor cores and memory elements on the same chip allows effective utilization of the chip area. A distinction is drawn in the chip between the instruction cache, the data cache and on-chip SRAM. The instruction and data cache memories are high-speed local memories, which form an interface between the processor and the off-chip memory.

Mobile communication terminals with higher functionality, such as smartphones, generally have two main processors, specifically a modem processor or modem controller, and an application processor. A digital signal processor (DSP) is also always provided, and is generally combined with the modem controller, being referred to as a baseband chip set (GSM+ protocol, thus corresponding (for example) to DSP+mC). As a result of the addition of the application programs to be processed, subdivision into a baseband chip set and an application processor was necessary, in which the application processor, which is also often referred to as a coprocessor, has to process all the application programs.

The publication "Developing Embedded Software in Multi-Core SoCs" from the British company Chip-Design-Firma ARM Ltd. (Author: Paul Kimelman) describes a very wide range of configurations and applications of multiprocessor systems in the field of embedded processor cores. These applications relate essentially to real-time requirements for the various tasks, for example, in a mobile communication terminal. The publication then proposes suitable hardware architectures and discusses their performance on the basis of these requirements.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a method for processing tasks in mobile communication terminals, by means of which the tasks can be processed within a shorter time.

The method according to the invention is based on the fact that a mobile communication terminal contains a number of microprocessors. The invention is thus based on an existing and known hardware configuration, and attempts to improve its efficiency in the processing of the tasks. This is achieved by the tasks to be processed being distributed between the microprocessors as a function of an operating mode. In contrast to the subject matter relating to the prior art, in which there is a fixed task assignment that is maintained in each operating mode, the processing of the tasks in the present invention is carried out in a flexible manner. The efficiency of the system is in this way improved in operating situations in which individual processors do not need to process any tasks by virtue of that situation.

In this case, the tasks can first of all be allocated in a defined manner to specific processors as preferred, so that the processing of the tasks is in principle carried out in a standard manner. When predetermined operating situations are reached, it is then possible to provide for the processing of the tasks to be at least partially carried out by processors other than those allocated. This allows processors which do not have to process any tasks, or have to process only a small number of the tasks assigned to them, in specific operating situations, to take on such tasks since these tasks do not occur in these operating situations, or occur only to a reduced extent, to be used for the processing of other tasks, in order in this way to reduce the load on the processors which process these other tasks in a standard manner.

For the purposes of the invention, one operating mode may be a situation in which the terminal is not being used for payload signal transmission. However, other operating modes are also feasible, in which the amount of work for a processor is significantly reduced in such a way that redistribution of the tasks according to the invention is worthwhile. For example, when carrying out data matching in the terminal, one such operating mode may occur when carrying out data matching in the terminal via the Bluetooth or IrDA interface with other appliances. However, the operating modes may also be defined on the basis of specific parameters such as the (movement) speed of the terminal, or the data transfer speed. Parameter ranges may be defined and allocated to the various operating modes.

The method according to the invention can be used particularly advantageously for a mobile communication terminal that has an application processor and a modem processor. In operating situations in which no payload signals are being transmitted, that is to say no telephone call is being made nor is any other data being transmitted, there are only a small number of tasks which have to be processed by the modem processor, so that tasks can be redistributed from the application processor to the modem processor. Since the mobile communication terminal also contains a DSP (Digital Signal Processor), tasks may also be redistributed from the application processor to the DSP as a function of the operating mode, since certain prepared applications can also be processed by the DSP. Tasks may be redistributed to the DSP in addition or as an alternative to the movement of the tasks to the modem controller.

The tasks that are assigned as standard to the application processor are typically application programs. One example of an application program is the processing of image or video sequences that have been recorded by means of the digital camera installed in the mobile communication terminal, or those which have been received from another terminal, and have been buffer-stored in a memory. The recording or reading of signals from the image sensor and the compression and storage of the video data in the video sequence is an application that demands a high degree of computation power. In the best case, the method according to the invention allows the processing speed to be increased linearly with the number of processors involved in the processing.

BRIEF DESCRIPTION OF THE DRAWINGS

Further details of the invention will be described in the following text.

DETAILED DESCRIPTION OF THE INVENTION

Figure 1:
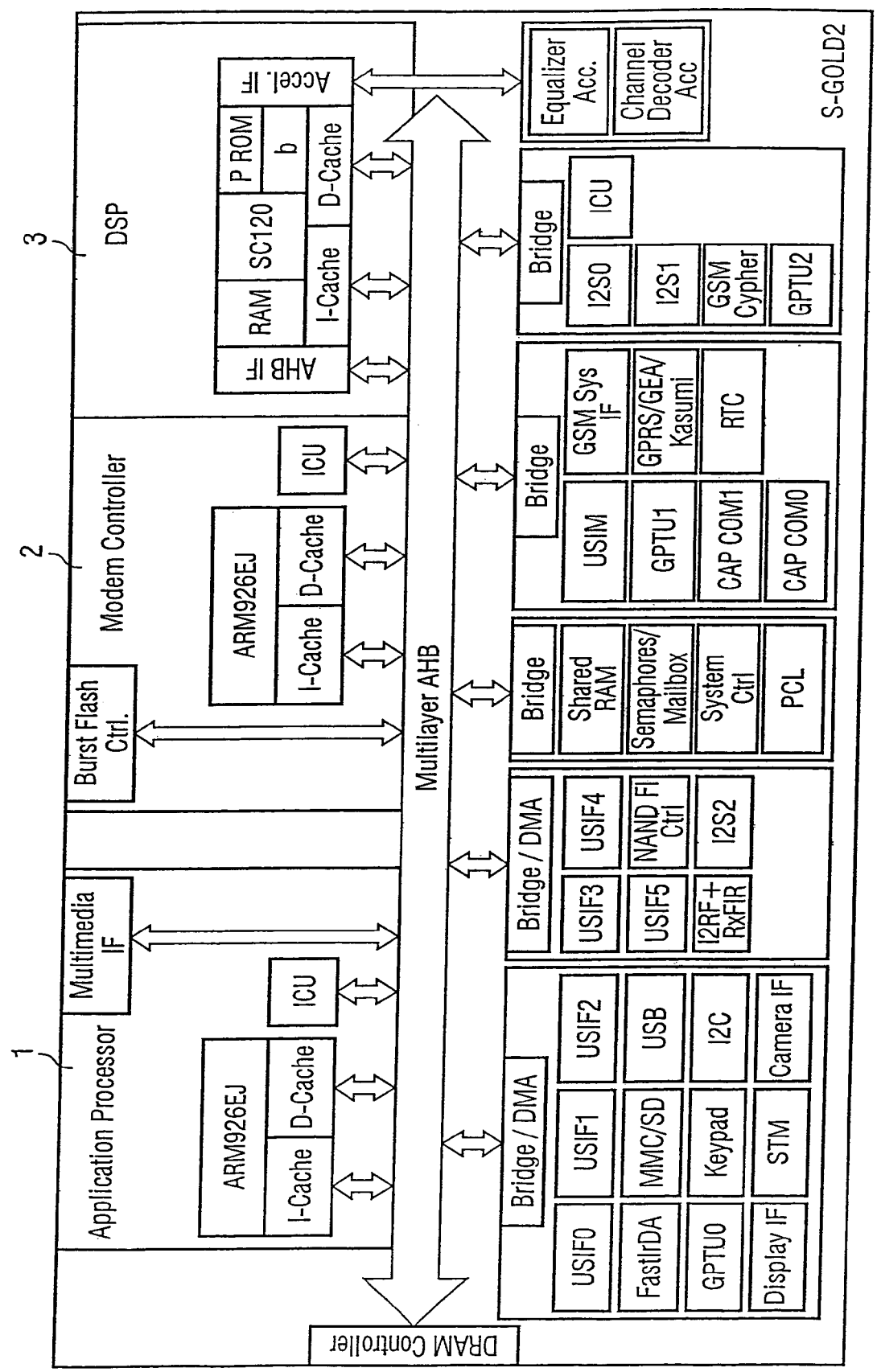
FIG. 1 is a schematic block diagram of the architecture of a baseband chip.

The baseband chip illustrated in the present example is a GSM/E-GPRS baseband controller that contains an application subsystem. The subsystems thereof are the application subsystem, the modem controller subsystem and the DSP subsystem. These subsystems are in the form of embedded systems in the present example.

The application subsystem comprises a microprocessor (MPU) that is used as the application processor 1 (AP), and a set of peripheral components, which are mainly used for applications. The main task of the AP is to operate the application operating system (OS), which contains the user interface (MMI, Man-Machine Interface) and the applications. The application processor 1 is connected to an instruction cache memory (I cache) and to a data cache memory (D cache).

The modem controller subsystem comprises a second microprocessor (MPU), which is used as a modem controller 2 or modem processor (MC), and a set of peripheral components, which are mainly used for system control and for modem support. The main task of the MC is to process the GSM/E-GPRS protocol stack (PS). The modem controller 2 is also connected to an instruction cache memory (I cache) and to a data cache memory (D cache).

The DSP subsystem comprises a DSP 3 (digital signal processor) and a set of peripheral components and accelerators, which are employed for the modem functionality. The main task of the DSP is to process the channel and speech coding and decoding tasks.

The GSM/E-GPRS protocol stack has to comply with real-time requirements (RT). Conventional application operating systems cannot guarantee such real-time requirements. It is difficult to process the protocol stack and the application operating system on the same MPU, and a high degree of complexity is required for optimization and error correction. Furthermore, the application performance would be reduced, since the protocol stack likewise consumes computation power from this MPU. For this reason the baseband chip architecture contains an MPU which is provided for applications (processor 1), and an MPU which is provided for the protocol stack (processor 2).

The protocol stack (PS) processing is mainly active when a call or a (E–) GPRS data transmission is taking place. Whenever the terminal is in a standby mode, that is to say it is waiting for a call or data transmission, the modem enters a so-called paging mode.

Paging is an energy-saving measure that allows the modem to be switched off for most of the time. The connection between the terminal and the base station is activated only for a short time period at predetermined times, in order to carry out a check of incoming calls or data transmission processes, or when, for example, a cell change is taking place. Paging lasts for the order of magnitude of 1 ms, and is carried out at intervals of 0.5 to 2 seconds. In-between, the modem controller 2 can be switched off in order to save energy.

Most applications are generally carried out when the modem is in the paging mode. For example, the recording of a video sequence by means of the built-in digital camera is normally not carried out at those moments when the terminal is being used for a call. The available computation power of the modem controller 2 can thus be used in the paging mode to assist the application for as long as the modem controller is available for this purpose.

The recording and the coding and/or compression of a video sequence is an application which requires large amounts of computation power. In a mobile terminal, the coding and compression are typically carried out in accordance with the MPEC 4 or H.263 Standard. These coding standards operate with so-called macro blocks. A macro block is a block of 16×16 pixels. The coding includes a process that is referred to as movement prediction (motion estimation), and is based on time correlation of the image content. Each macro block in a frame relating to a time t is checked with respect to a region in the vicinity of this block relating to a time t+1. The movement prediction defines a movement vector for each block, which indicates where the block will move to from one time frame to the next. Movement prediction for a macro block is a task that is carried out for a specific image region around the macro block. Since it is carried out for each macro block, it can easily be distributed between a number of MPUs, by allocating different macro block regions to different MPUs. A virtually linear increase in the processing speed can thus be expected if this task is assigned to more than one MPU.

In some instances, movement prediction consumes between 30% and 80% of the computation power for the entire coding algorithm depending on the chosen performance of the movement prediction algorithm (partial search in comparison to complete search, etc.). An MPEG-4 coding performance of 10 fps (frames per second) can be expected on a single microprocessor. In this case, the modem controller 2 could be involved as a coprocessor in this part of the processing, in order to calculate the difference sums, with large computation power levels being required. With a given complexity of the movement prediction of between 30% and 80%, and on the assumption that each of the processors is responsible for 50% of the movement prediction (with regard to the frame regions), and ignoring a certain overhead component for data movement, the overall increase in speed of the processing can be estimated to be a value between 15% and 40%. In quality terms, this is equivalent to the video quality of a coding performance of 11.5 to 14 fps. However, the precise extent of the improvement likewise depends on the data overhead transferred between the AP and the MC, and the resource management.

Another possible way to improve the coding performance is to move parts of the coding process completely to the modem controller, such as functional blocks that form the decoding model within the coding process. A considerable proportion of the image processing application could thus likewise be redistributed from the AP 1 to the MC 2, so that the AP can process the remaining tasks better. Compared with movement prediction, other functions require less computation power, so that the speeding up of the processing is not as dramatic as the theoretical speeding up that would result if the movement prediction were to be distributed uniformly between two processors. However, it should be easier to hand over the decoding model to the MC 2, since the data dependency between the AP 1 and MC 2 is decoupled by means of the frame buffer.

Both of the described options for movement or distribution of tasks from the application processor to the modem processor reduce the computation time, thus allowing the video quality to be improved for the end user (expressed in frames per second). The described tasks and other tasks may also be redistributed to the DSP additionally or alternatively.

Figure 2:
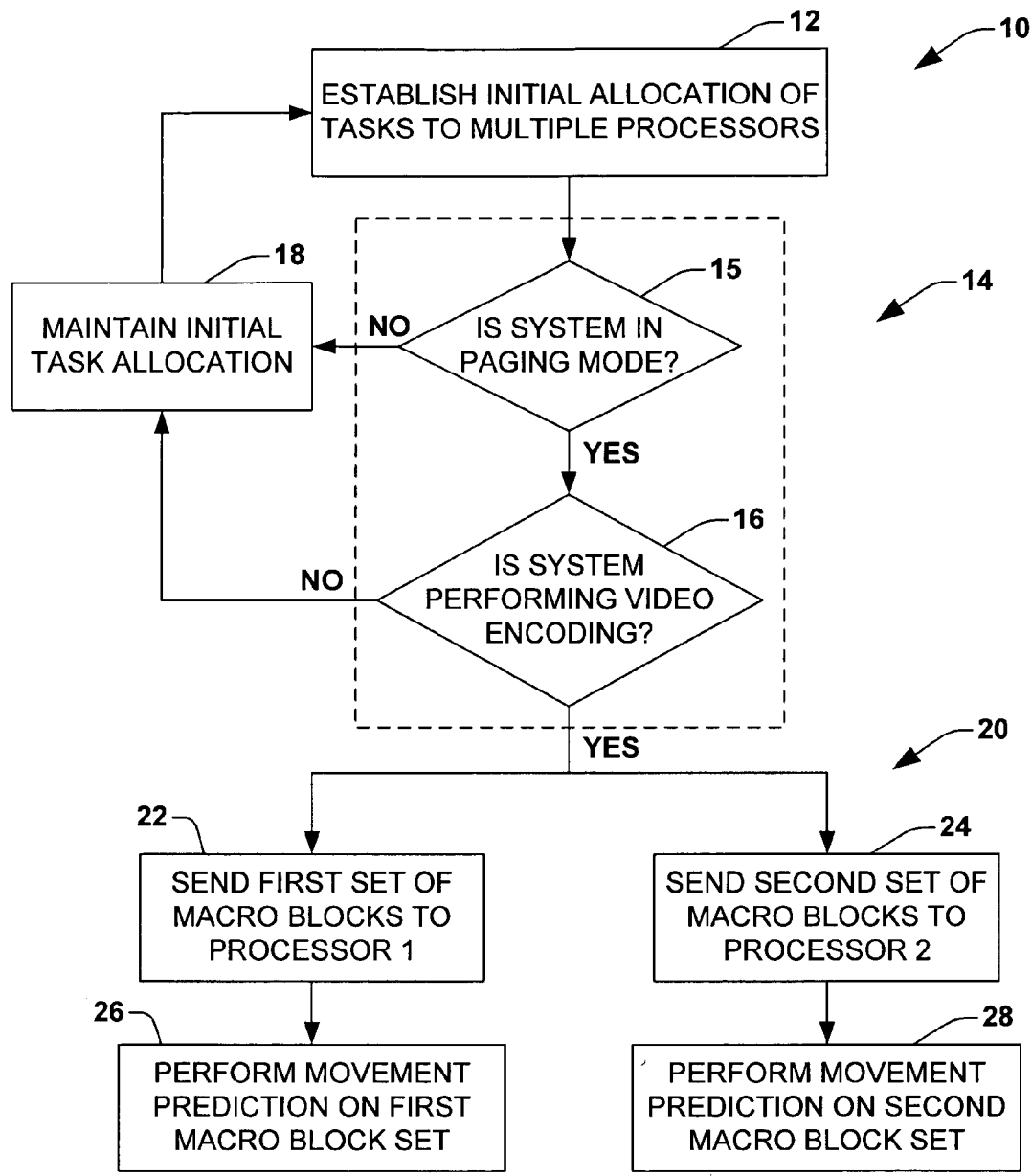
FIG. 2 is a flow chart illustrating a method of processing tasks in accordance with the invention.

In accordance with another aspect of the invention, a method of processing tasks in a mobile communications terminal is disclosed, as illustrated in FIG. 2 at reference numeral 10. While the exemplary method 10 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention.

The method 10 begins at 12, wherein an initial allocation of tasks is established for the multiple processors. In one exemplary instance, such allocation would correspond to the prior art, wherein processors are dedicated for particular tasks. A query is then made at 14 regarding the mode the mobile communication terminal is in. For example, the query might entail a determination of whether the terminal is in a paging mode at 15, and if so (YES at 15), whether a video encoding process is to be performed at 16. If a determination is made at 14 that one of one or more predetermined modes is not in operation (e.g., NO at 15 and/or 16) then the initial task allocation among the multiple processors is maintained at 18.

If, however, a determination is made at 14 that the mobile communication terminal is in one of one or more predetermined operating modes (e.g., YES at 15 and 16), then an altering of the initial allocation of tasks among the processors is performed at 20. For example, if a determination is made that a video encoding task is being performed, an alteration of task allocation may comprise the sending of some macro blocks of data to a first processor (e.g., the application processor 1) at 22 and sending another group of macro blocks to a second (or third) processor (e.g., the modem controller 2 and/or the DSP 3) at 24. Subsequently, movement prediction tasks are performed at 26 and 28, respectively, based on the different set(s) of macro blocks in a generally concurrent fashion. Accordingly, the video encoding tasks is completed more quickly than conventionally without requiring additional dedicated processors.

As may be appreciated, the paging mode is only one exemplary mode in which task allocation may be altered among multiple processors in the present invention. It should be clear that other modes wherein an initial task allocation may be altered to increase efficiency may exist and such variations are contemplated as falling within the scope of the present invention.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for processing tasks in a mobile communication terminal having two or more processors, comprising:
   initially allocating the tasks to specific processors in a defined manner;
   altering the allocation of some, but not all, of the tasks to a different processor instead of the initially allocated processor as a function of one or more operating modes of the mobile communication terminal, and
   performing the tasks allocated to the different processor in parallel to the tasks remaining allocated to the initially allocated processor;
   wherein the two or more processors in the mobile communication terminal comprise an application processor and a modem processor, and wherein distributing the tasks comprises redistributing one or more of the tasks from the application processor to the modem processor for a predetermined operating mode;
   wherein the operating mode in which the one or more tasks is redistributed from the application processor to the modem processor comprises a mode when no payload signals are being transmitted by the modem processor.

2. A method for processing tasks in a mobile communication terminal having two or more processors, comprising:
   initially allocating the tasks to specific processors in a defined manner;
   altering the allocation of some, but not all, of the tasks to a different processor instead of the initially allocated processor as a function of one or more operating modes of the mobile communication terminal, and
   performing the tasks allocated to the different processor in parallel to the tasks remaining allocated to the initially allocated processor;
   wherein the two or more processors in the mobile communication terminal comprise an application processor and a digital signal processor, and wherein distributing the tasks comprises predetermined redistributing the one or more tasks from the application processor to the DSP for a operating mode;
   wherein the operating mode in which the one or more tasks is redistributed from the application processor to the digital signal processor comprises a mode when no payload signals are being transmitted in the mobile communication terminal.

3. The method according to claim 1, wherein one of the one or more redistributed tasks comprises a processing of image data or video data.

4. The method according to claim 3, wherein the processing of the image data or video data comprises compressing or decompressing or both the image data or the video data.

5. A method for processing tasks in a mobile communication terminal having two or more microprocessors, comprising:
    establishing an initial allocation of tasks among the two or more microprocessors;
    determining a mode of operation of the mobile communication terminal, wherein determining the mode of operation comprises determining whether the mode is a paging mode, and wherein determining the mode of operation further comprises ascertaining whether a video encoding task is being performed if the paging mode is the mode of operation; and
    selectively altering an allocation of some, but not all, of the tasks among the two or more microprocessors based on the determined mode of operation, wherein altering the allocation of the tasks comprises:
        sending a first set of macro blocks of video data to a first processor;
        sending a second set of macro blocks of video data to a second processor; and
        performing a movement prediction task on the first set of video data in the first processor and a movement prediction task on the second set of video data in the second processor in a concurrent fashion.

6. The method of claim 5, wherein the first processor comprises an application processor, and the second processor comprises one of a modem controller and a digital signal processor.

7. The method of claim 5, further comprising maintaining the initial allocation of tasks among the two or more processors if the mode of operation is not one of one or more predetermined operating modes.

8. A method for processing tasks in a mobile communication terminal having two or more processors, comprising:
    initially allocating the tasks to specific processors in a defined manner;
    altering the allocation of the tasks to a different processor instead of the initially allocated processor as a function of one or more operating modes of the mobile communication terminal;
    performing the tasks allocated to the different processor in parallel to the tasks remaining allocated to the initially allocated processor;
    wherein the two or more processors in the mobile communication terminal comprise an application processor and a modem processor,
    wherein distributing the tasks comprises redistributing one or more of the tasks from the application processor to the modem processor for a predetermined operating mode; and
    wherein the operating mode in which the one or more tasks is redistributed from the application processor to the modem processor comprises a mode when no payload signals are being transmitted by the modem processor.

9. A method for processing tasks in a mobile communication terminal having two or more processors, comprising:
    initially allocating the tasks to the two or more processors in a defined manner; and
    altering the allocation of some, but not all, of the tasks to a different processor instead of the initially allocated processor as a function of one or more operating modes of the mobile communication terminal; and
    performing the tasks allocated to the different processor in parallel to the tasks remaining allocated to the initially allocated processor;
    wherein the one or more operating modes from which the allocation of some of the tasks is altered comprises a mode when no payload signals are being transmitted by the different processor.

* * * * *